US009739229B2

(12) United States Patent
Hutchins et al.

(10) Patent No.: US 9,739,229 B2
(45) Date of Patent: Aug. 22, 2017

(54) LINEAR VALVE ACTUATOR SYSTEM AND METHOD FOR CONTROLLING VALVE OPERATION

(71) Applicants: Richard H. Hutchins, South San Francisco, CA (US); Michael E. Edmonds, San Bruno, CA (US)

(72) Inventors: Richard H. Hutchins, South San Francisco, CA (US); Michael E. Edmonds, San Bruno, CA (US)

(73) Assignee: SentiMetal Journey LLC, Reno, NV (US)

( * ) Notice: Subject to any disclaimer, the term of this patent is extended or adjusted under 35 U.S.C. 154(b) by 124 days.

(21) Appl. No.: 14/642,670

(22) Filed: Mar. 9, 2015

(65) Prior Publication Data
US 2015/0240736 A1    Aug. 27, 2015

Related U.S. Application Data

(63) Continuation of application No. 13/963,764, filed on Aug. 9, 2013, now Pat. No. 9,109,714, which is a
(Continued)

(51) Int. Cl.
*F01L 9/04*     (2006.01)
*F02D 41/26*    (2006.01)
(Continued)

(52) U.S. Cl.
CPC .............. *F02D 41/263* (2013.01); *F01L 1/34* (2013.01); *F01L 9/04* (2013.01); *F02D 41/1401* (2013.01);
(Continued)

(58) Field of Classification Search
CPC ....... F01L 1/34; F01L 9/04; F01L 2009/0403; F01L 2009/0407; F01L 2009/0478; F02D 41/263
(Continued)

(56) References Cited

U.S. PATENT DOCUMENTS 2,411,734 A    11/1946 Kerwin
4,009,695 A     3/1977 Ule
(Continued)

OTHER PUBLICATIONS

Baldor, "Servo, Linear & Motion Control Products Catalog" [online], Apr. 28, 2011, Retrieved from the Internet Archive: http://stevenengineering.com/Tech_Support/PDFs/92SERVO_LINEAR_Motion.pdf, 56 pages.
(Continued)

*Primary Examiner* — Ching Chang
(74) *Attorney, Agent, or Firm* — Skaar Ulbrich Macari, P.A.

(57) ABSTRACT

The system, according to one embodiment of the present invention, comprises a stationary coil linear motor to drive a valve with a stem comprising a ferromagnetic property. The linear motor moves the valve in response to control governed by an electronic valve control computer. The valve is movable between a closed position at a selectable rate of both acceleration and speed for a selectable distance ("lift") to a second selectable open position, including all position variations between the fully open and fully closed states. Valve position, velocity and acceleration can be varied both during a valve stroke and from one stroke to the next, as controlled by the logic programmed on a non-transitive memory of the electronic valve control computer.

20 Claims, 17 Drawing Sheets

Related U.S. Application Data continuation-in-part of application No. 13/290,353, filed on Nov. 7, 2011, now abandoned.

(51) Int. Cl.
| | | |
|---|---|---|
| *F16K 31/06* | (2006.01) | |
| *F02D 41/14* | (2006.01) | |
| *H01F 7/18* | (2006.01) | |
| *F01L 1/34* | (2006.01) | |
| *F02D 41/34* | (2006.01) | |
| *F02D 41/00* | (2006.01) | |

(52) U.S. Cl.
CPC ........ *F02D 41/345* (2013.01); *F16K 31/0655* (2013.01); *F16K 31/0658* (2013.01); *F16K 31/0675* (2013.01); *H01F 7/18* (2013.01); *F01L 2009/0403* (2013.01); *F01L 2009/0407* (2013.01); *F01L 2009/0478* (2013.01); *F02D 2041/001* (2013.01)

(58) Field of Classification Search
USPC .................................. 123/90.11; 251/129.01
See application file for complete search history.

(56) References Cited

U.S. PATENT DOCUMENTS

| | | | |
|---|---|---|---|
| 4,794,890 A | 1/1989 | Richeson, Jr. | |
| 5,188,336 A | 2/1993 | Graner et al. | |
| 5,572,961 A | 11/1996 | Schechter et al. | |
| 5,598,814 A | 2/1997 | Schroeder et al. | |
| 5,873,335 A | 2/1999 | Wright et al. | |
| 5,983,847 A | 11/1999 | Miyoshi et al. | |
| 6,047,672 A | 4/2000 | Hanai et al. | |
| 6,247,431 B1 | 6/2001 | Toriumi | |
| 6,293,303 B1 | 9/2001 | Mori et al. | |
| 6,318,312 B1 | 11/2001 | Bauer et al. | |
| 6,321,701 B1 | 11/2001 | Vorih et al. | |
| 6,390,443 B1 | 5/2002 | Katayama et al. | |
| 6,397,797 B1 | 6/2002 | Kolmanovsky et al. | |
| 6,666,178 B1 | 12/2003 | Keller et al. | |
| 6,681,728 B2 * | 1/2004 | Haghgooie | F01L 9/04 123/90.11 |
| 6,729,279 B1 | 5/2004 | Lundqvist et al. | |
| 6,736,092 B2 | 5/2004 | Borean et al. | |
| 7,047,919 B2 | 5/2006 | Morin et al. | |
| 7,225,770 B2 | 6/2007 | Simpson | |
| 7,392,774 B2 | 7/2008 | Magner et al. | |
| 7,869,929 B2 | 1/2011 | Sugihara | |
| 7,878,480 B2 | 2/2011 | Vattaneo et al. | |
| 8,056,541 B1 | 11/2011 | Nick | |
| 8,087,392 B2 | 1/2012 | Swanbon et al. | |
| 8,374,769 B2 | 2/2013 | Moriya | |
| 8,402,942 B2 | 3/2013 | Tripathi et al. | |
| 2004/0031455 A1 | 2/2004 | Muraji | |
| 2004/0113731 A1 | 6/2004 | Moyer et al. | |
| 2005/0126521 A1 | 6/2005 | Simpson | |
| 2006/0213467 A1 | 9/2006 | Froeschle et al. | |
| 2007/0044741 A1 | 3/2007 | Daniel | |
| 2007/0295291 A1 | 12/2007 | Luercho | |
| 2011/0234210 A1 | 9/2011 | Hayashi et al. | |
| 2012/0167849 A1 | 7/2012 | Hutchins et al. | |
| 2012/0291727 A1 | 11/2012 | Keller et al. | |
| 2013/0098337 A1 | 4/2013 | Carlson et al. | |

OTHER PUBLICATIONS

Md Forhad Khandaker, Voice Coil Actuated Variable Valve Timing System for Spark Ignition Engines, Mar. 2006, Concordia University, Montreal Quebec Canada, Department of Mechanical and Industrial Engineering, 171 pages.

Search Report and Written Opinion for PCT/US2014/49953, Feb. 10, 2015, 16 pages.

Autozine Technical School, Continuous Variable Valve Lift (CVVL), http://www.autozine.org/technical_school/engine/vvt_5.html, Jan. 1, 1997, 4 pages.

Julian Edgar, BMW's Valvetronic! The first petrol engine without a throttle butterfly?, http://www.autospeed.com/cms/A_111539/article.html, Jan. 1, 2001, 3 pages.

* cited by examiner

LINEAR VALVE ACTUATOR SYSTEM AND METHOD FOR CONTROLLING VALVE OPERATION

PRIORITY

This Application is a Continuation Application of U.S. patent application Ser. No. 13/963,764, filed Aug. 9, 2013, which is a Continuation-In-Part Application of U.S. patent application Ser. No. 13/290,353, filed Nov. 7, 2011; each of which are incorporated herein by reference in their entirety.

FIELD

The present invention relates generally to valve actuation systems, and more particularly, to linear motor actuated valve trains, and control systems therefore, for internal combustion engines and other applications.

BACKGROUND

Fossil fuels currently power the majority of modern internal combustion engines (ICEs). But hydro carbon fuels derived from petroleum and other stocks are a scarce resource and the extensive use of such fuels in automobiles is believed by many persons to contribute to undesirable climate change due to the byproducts of combustion. Therefore, there is tremendous pressure to increase the efficiency of the modern internal combustion engine. The demand for increased efficiency is also driven by government quotas, mandates and taxes regarding fuel consumption and $CO_2$ emissions. And this is occurring simultaneously with increasing demands to enhance safety of automobiles, which often increases weight to the detriment of efficiency.

Current steps employed to increase efficiency of ICEs can add considerable cost and complexity while decreasing reliability, power and drivability. For example, there have been numerous attempts to add adjustability to the operation of the intake and/or exhaust valves during the operating cycles of ICEs.

Traditionally the intake and exhaust valves (also referred to as poppet valves) of an ICE have been actuated by one or more camshafts which are mechanically driven from the ICE crankshaft at half engine speed, thereby operating the valves in synchronism with the ICE rotation, and in a fixed phase with one another. It is also known to substitute rotary valves for poppet valves, again mechanically driving the valves from the crankshaft and rigidly slaving the valve operation to ICE crankshaft rotation.

The camshaft profile defines timing of the valve open/close movements. Camshaft design is an exercise in tradeoffs because a given camshaft profile can only be optimized for a very narrow range of crankshaft speeds (measured in rotations per minute (RPMs)). Thus compromises must be made to facilitate easy starting and operation over a broad range of speeds, and these compromises decrease the overall efficiency of the ICE and require great complexity.

Moreover, the mechanical camshaft has a fixed amount of valve movement (lift) and time that the valve is open (degrees of duration). The opening times and closing times of the valves are also rigidly fixed by the mechanical drive systems and camshaft profile. Adding additional camshafts and valves allows optimizing one camshaft/valve system for low speed and the other for high speed, but this still has to be compromised in order to allow easy starting and a broad range of operating speeds.

It is further known that the camshaft(s) may be rotationally advanced and/or retarded with respect to the crankshaft rotational position by various means such as hydraulically bi-directionally rotating the drive mechanism of the camshaft. This is referred to as "phasing" the cam. Phasing facilitates operation of the ICE at various times, temperatures, conditions, loads and altitudes. As is also well known, this form of making adjustments to engine timing may be enhanced further by adjusting valve lift in a variety of ways. However, such systems suffer from heightened complexity. For example, the manufacturing precision required of all of the many parts is heightened, which adds cost and points of failure.

Also, the precise viscosity of the hydraulic fluid required to operate the many parts further adds to costs and expense of maintenance. It is desirable to have the valve actuation systems use engine oil as the required hydraulic fluid for operation. But, even oils meeting current API and SAE specifications may not be precise enough viscosity to meet the requirements of these applications. This necessitates specialized lubricants be used, which limits the motorist's ability to acquire top-up oil, perform their own oil changes, and adds to the cost of automobile maintenance.

Further problems with the camshaft phasing technologies described above are that valve timing, valve duration and valve lift are fixed. These parameters can only be changed slightly and such change requires expensive and complex technology.

Certain attempts have been made to overcome the shortcomings of the technologies discussed above and achieve independent valve operating times and duration. For example, U.S. Pat. No. 4,009,695 discloses a Programmed Valve System for Internal Combustion Engine. This patent teaches a means for valve operation independent of crankshaft position, but suffers from problems inherent to hydraulic operation of the valves. In particular, operation of the valves involves cycling the valve from open to closed in an uncontrolled manner. Such operation is particularly damaging to the valve and valve seat upon the valve closing. Also, the length of stroke of the hydraulic movement (i.e., valve lift) is not variable in this mechanism.

U.S. Pat. No. 6,736,092 discloses an internal-combustion engine equipped with an electronically controlled hydraulic system for variable actuation of the inlet and/or exhaust valves of the engine. In particular, this patent teaches the use of a standard camshaft that is mechanically slaved to the crankshaft of an ICE, but with the additional disposition of an electronically controlled hydraulic lifter between the camshaft and the valve. Through electronic control of the hydraulic fluid in and out of the lifter, the opening and closing time of the valve and the lift of the valve can be controlled to some extent. However, this arrangement is limited to the operation of the mechanically slaved camshaft and, for instance, cannot command a valve to open at maximum lift for a long duration, or at a different time than the camshaft scheduled opening time.

Attempts have been made to make ICE valve operation independent of crankshaft positioning by driving the valves open and shut with hydraulic pressure that is applied by electrical means. An electrical command is sent by control unit, which receives input from engine and associated system sensors. However, such systems still suffer from significant drawbacks as will be explained below.

U.S. Pat. No. 5,572,961 discloses a Balancing Valve Motion in an Electro Hydraulic Camless Valvetrain. This patent teaches a minimization of hydraulic valve controls for the ICE valves and operation of an ICE using hydraulically operated ICE valves. High hydraulic pressure is used to push the valve in one direction while low hydraulic pressure combined with a balancing spring to cushion and stop the ICE valve movement. The multiple hydraulic valve controls per ICE valve, balancing springs and multiple hydraulic pressures add significant complexity to the system however. Further, it is difficult to control the ICE valve lift variations with this system.

U.S. Pat. No. 6,729,279 discloses an Apparatus for Controlling at Least One Engine Valve in a Combustion Engine. This patent teaches hydraulically operated valves in the ICE as controlled by a control system. It is taught that an upper chamber should be charged with fluid to close the ICE valve and a lower chamber should be charged to lift the valve. One drawback with this mode of moving an ICE valve is that the hydraulic fluid control valves can only be in open or closed states. The patent teaches that a "throttle" valve may be disposed in the hydraulic line to adjust the total movement (lift) and movement speed of the ICE valve, as the ICE valve moves from open to closed and vice versa. This patent also addresses the need for dampening of hydraulically operated ICE valves by utilizing a complex means to attempt to achieve such dampening.

It has also been attempted to operate the ICE valves by pneumatic means. Again, such configurations can actuate the valves independent of the ICE crankshaft position. For example, in US Patent Application Publication No. 2013/0098337 A1, a so-called Free Valve System is disclosed. This system uses air directed through electrically operated control valves to push the ICE valves open and shut. A major drawback of such systems is that the ICE valves slam into their limit stops upon opening and also slam into the valve seats upon closing. Such slamming causes mechanical damage to the valves fairly quickly.

Yet another attempt to resolve the deficiencies of camshaft-operated valves has been to electrically operate the valves using computer control in a similar fashion to electronic fuel injection. To date, all of these include some form of solenoid for valve actuation and also a dampening means. A solenoid operates by fully opening and fully closing the device that it acts upon. Solenoids cannot be controlled to move at a variable rate or to vary speed upon opening/closing. The only way to vary the rate of opening, stopping, closing or movement distance (lift) in a solenoid operated system is with external mechanical devices, which add to the overall complexity of the system. The solenoid arrangement and drawbacks can be understood with reference to examples thereof.

U.S. Pat. No. 4,794,890, for example, discloses an Electromagnetic Valve Actuator. This patent teaches the use of a bi-stable electromechanical transducer to move the valves in an ICE. The patent teaches the need for some form of dampening at the end of either transition (open or closed) of the valves. Both mechanical springs and a fluid shock absorber as damper are disclosed as dampening means. While this invention controls ICE valve opening and duration, it has no provision for variable lift which is preferable to facilitate easy starting, idling and low speed operation. The dampening techniques proposed by this invention are also complex and raise reliability concerns.

U.S. Pat. No. 6,247,431 discloses an Electromagnetic Valve Actuating Apparatus for Internal Combustion Engine. This patent teaches the use of two solenoids formed on the ICE valve stem, one to open and one to close the valve. Additionally, springs on the valve hold the valve in a nominally closed position. The springs will serve to minimally cushion the opening of the valve and no other dampening or cushioning means is provided for valve closing. As a result, reliability of the disclosed system is suspect. Also, no provision is provided for variable lift adjustment of the valve.

U.S. Pat. No. 7,225,770 discloses an Electromagnetic Actuator Having Inherently Decelerating Actuation Between Limits. This patent attempts to solve the drawbacks of conventional valve actuation systems with yet another configuration of a solenoid system, albeit with coils, armatures and mechanical springs. The configuration and locations of the coils and armatures, the addition of ICE valve position sensing, and coil current control are an improvement over previous attempts to prevent valve destruction. However, reliability remains a concern and, again, no means are provided to adjust valve lift.

U.S. Pat. No. 5,983,847 and U.S. Pat. No. 6,293,303 each disclose the use of moving coils to actuate valves. However, the movement of the coil and its significant support structure and attachment hardware requires an undesirably large coil size and powerful electrical drive system. The corresponding mass, size, excessive drive forces needed, and complexity of the drive system makes such an arrangement impractical, unaffordable and unreliable for many applications such as modern ICEs.

Thus, there remains a need to provide a valve actuation system, method and device for ICEs that reduces cost, weight and complexity, while providing for independent control of a variety of valve actuation parameters.

SUMMARY

The present invention addresses certain deficiencies discussed above by providing for a device, method and system of actuating valves using a linear motor comprising a stationary coil and a translating valve stem to variably control the movement of a valve with a high degree of accuracy and speed. Both velocity and position of the valve can be constantly varied from stroke to stroke and during a single stroke, if desired. The device and system can be implemented in a relatively small sized package. Moreover, the valve's movement can be controlled by an electronic valve control (EVC) computer. A plurality of sensors provide feedback to the computer, which actuates the valve based upon the sensor inputs and logic programmed in the non-transitive memory of the computer.

The system, according to one embodiment of the present invention, comprises a stationary coil linear motor to drive a valve with a stem comprising a ferromagnetic property. The linear motor moves the valve in response to control governed by the computer. The valve is movable between a closed position at a selectable rate of both acceleration and speed for a selectable distance ("lift") to a second selectable open position, including all position variations between the fully open and fully closed states. Valve position, velocity and acceleration can be varied both during a valve stroke and from one stroke to the next.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations and applications, or in isolation, without departing from the scope of the present invention.

Figure 1:
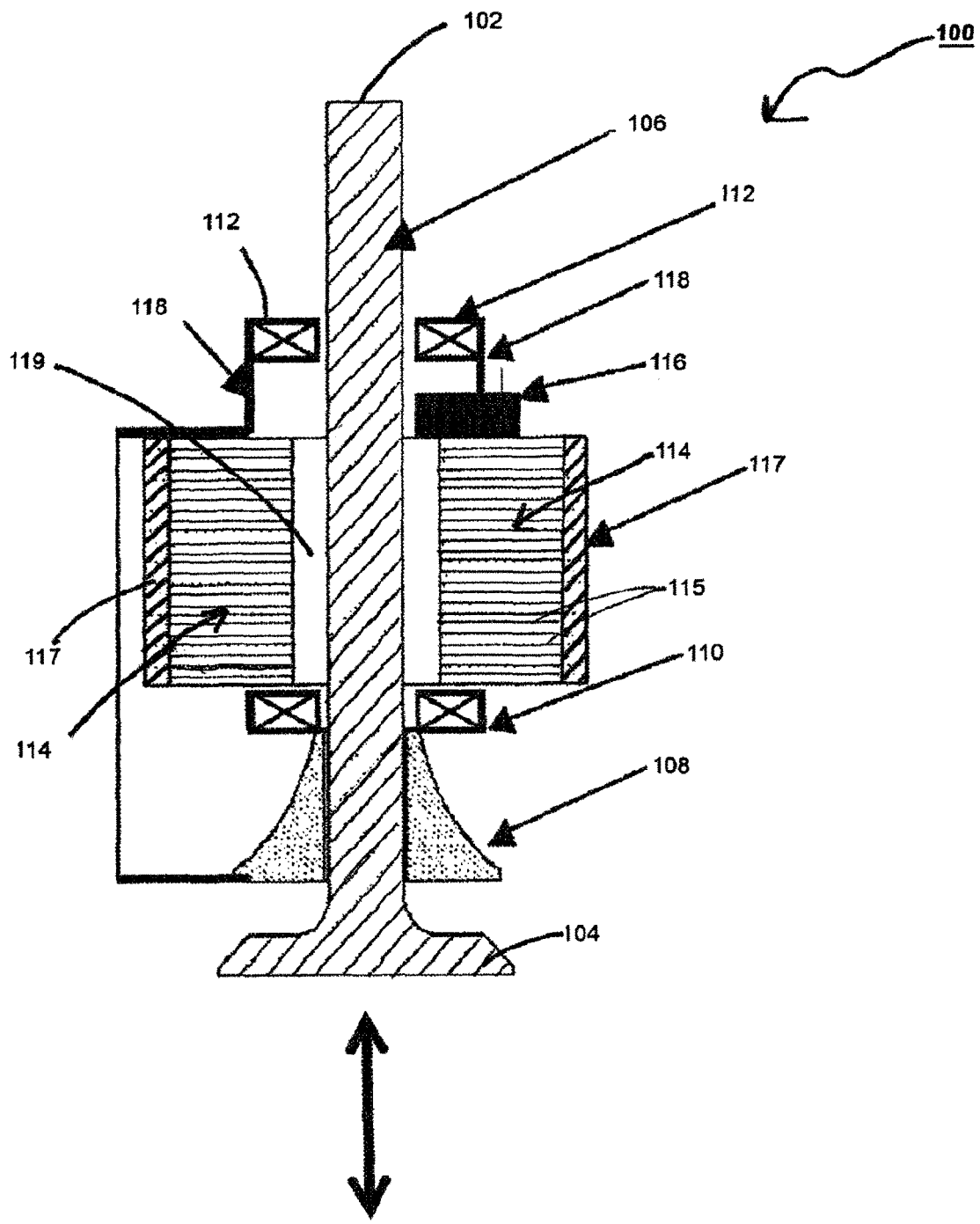
FIG. 1 is a cross sectional side view of a valve assembly according to certain example embodiments.
Figure 2:
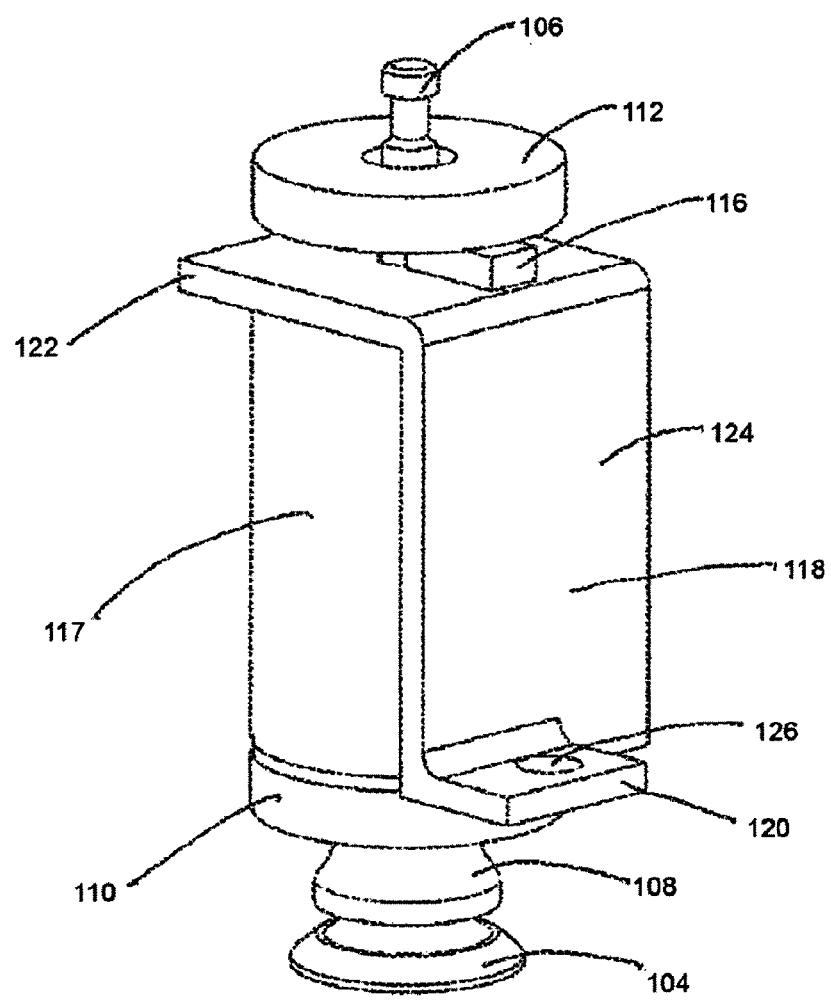
FIG. 2 is a perspective view of a valve assembly according to certain example embodiments.
Figure 3:
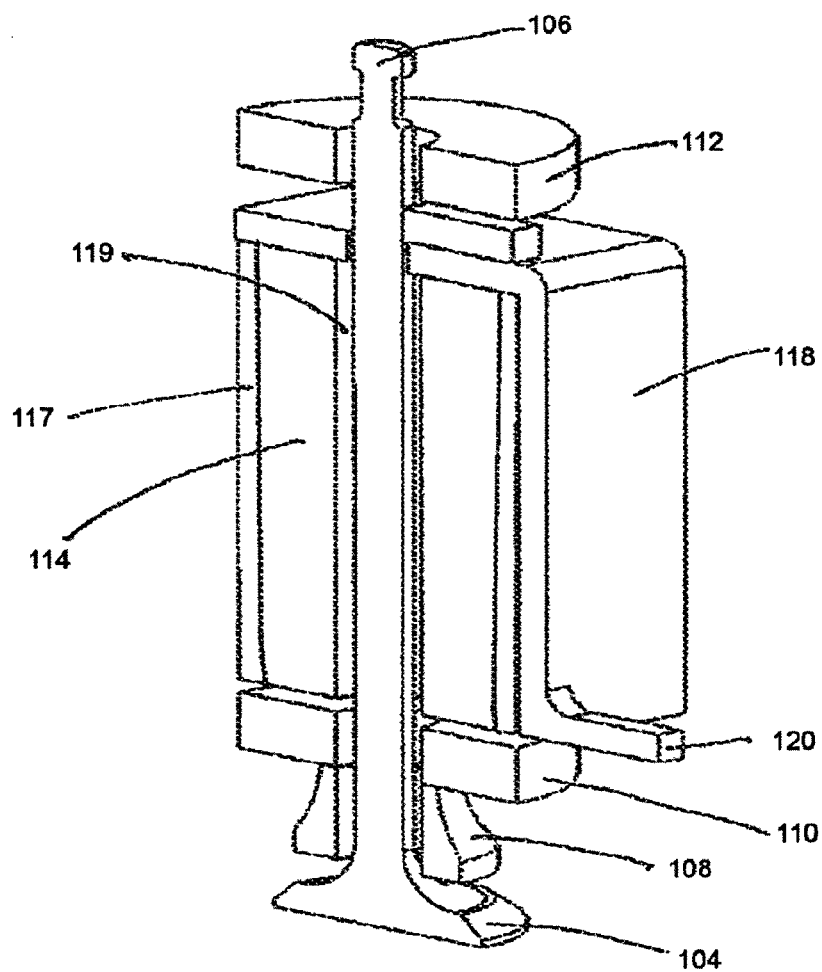
FIG. 3 is a cross sectional perspective view of the valve assembly of FIG. 2.
Figure 4:
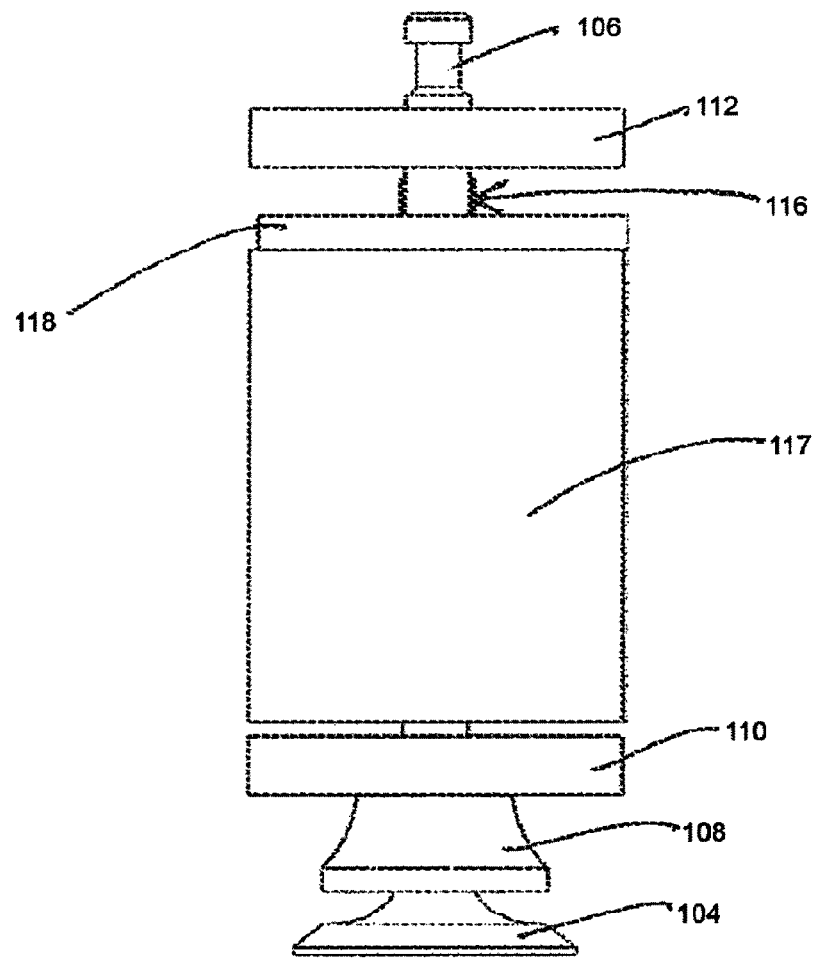
FIG. 4 is a front view of the valve assembly of FIG. 2.
Figure 5:
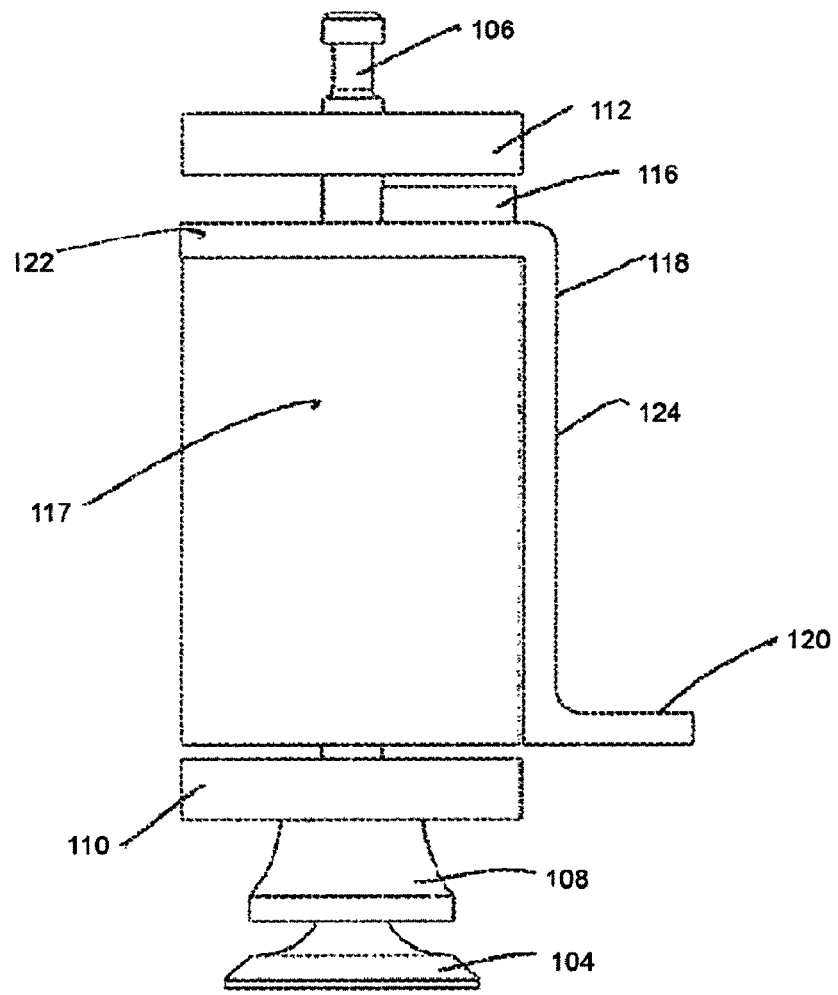
FIG. 5 is a side view of the valve assembly of FIG. 2.
Figure 6:
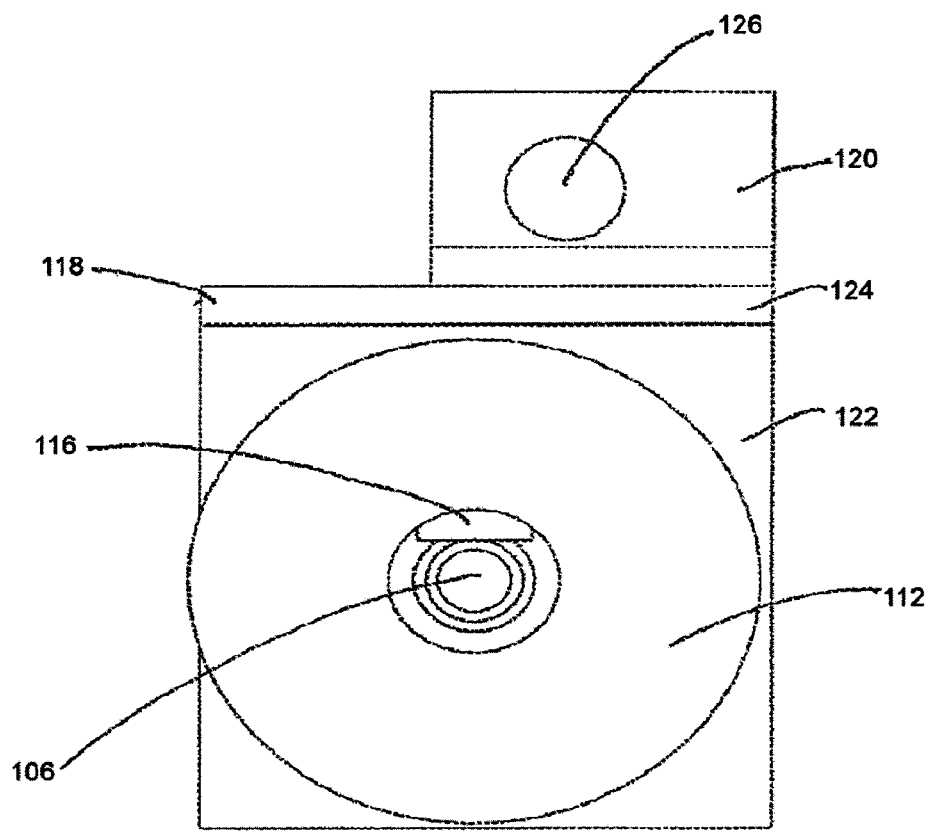
FIG. 6 is a top view of the valve assembly of FIG. 2.
Figure 7:
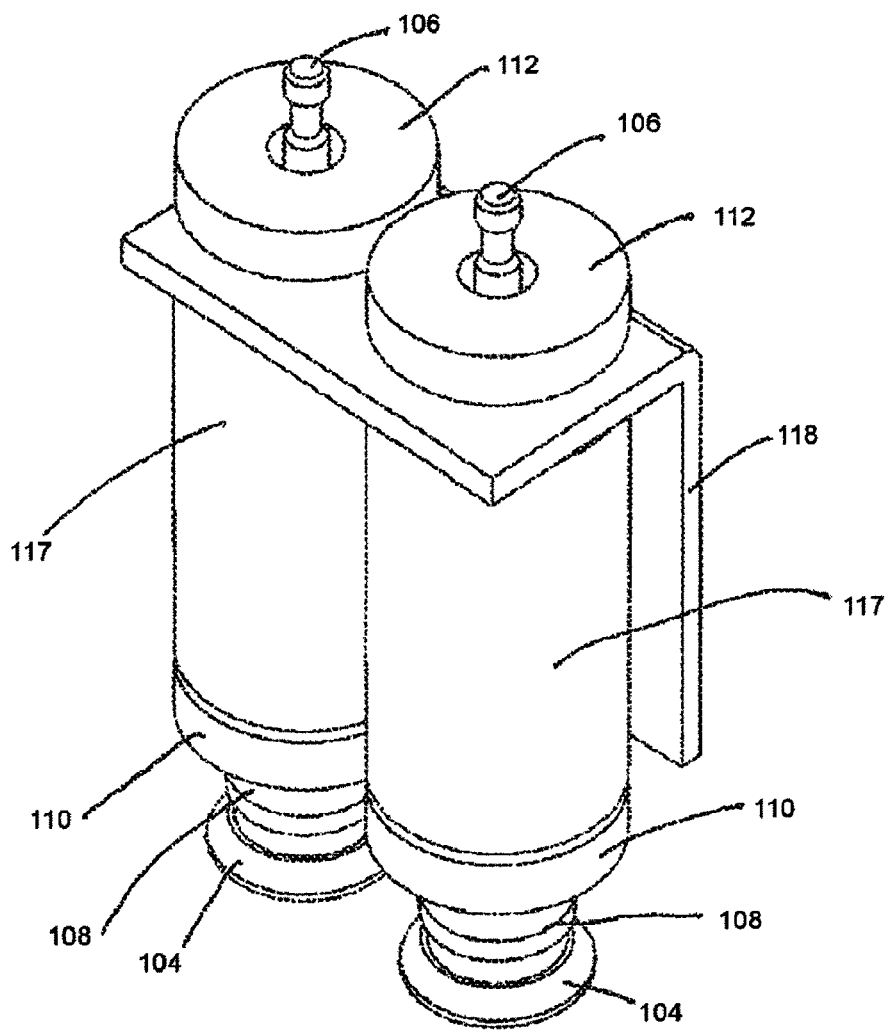
FIG. 7 is a perspective view of a dual valve assembly according to certain example embodiments.
Figure 8:
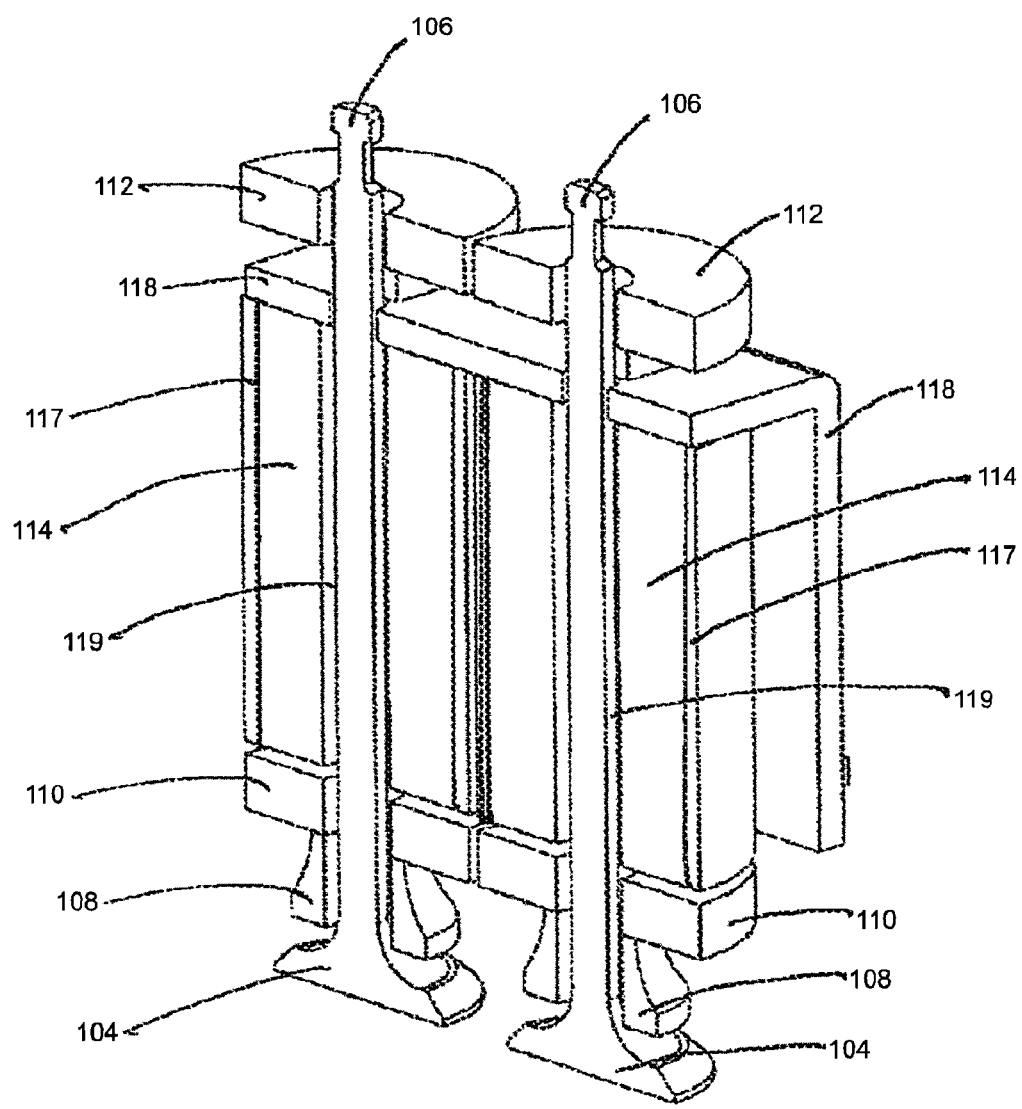
FIG. 8 is cross-sectional perspective view of the dual valve assembly of FIG. 8.
Figure 9:
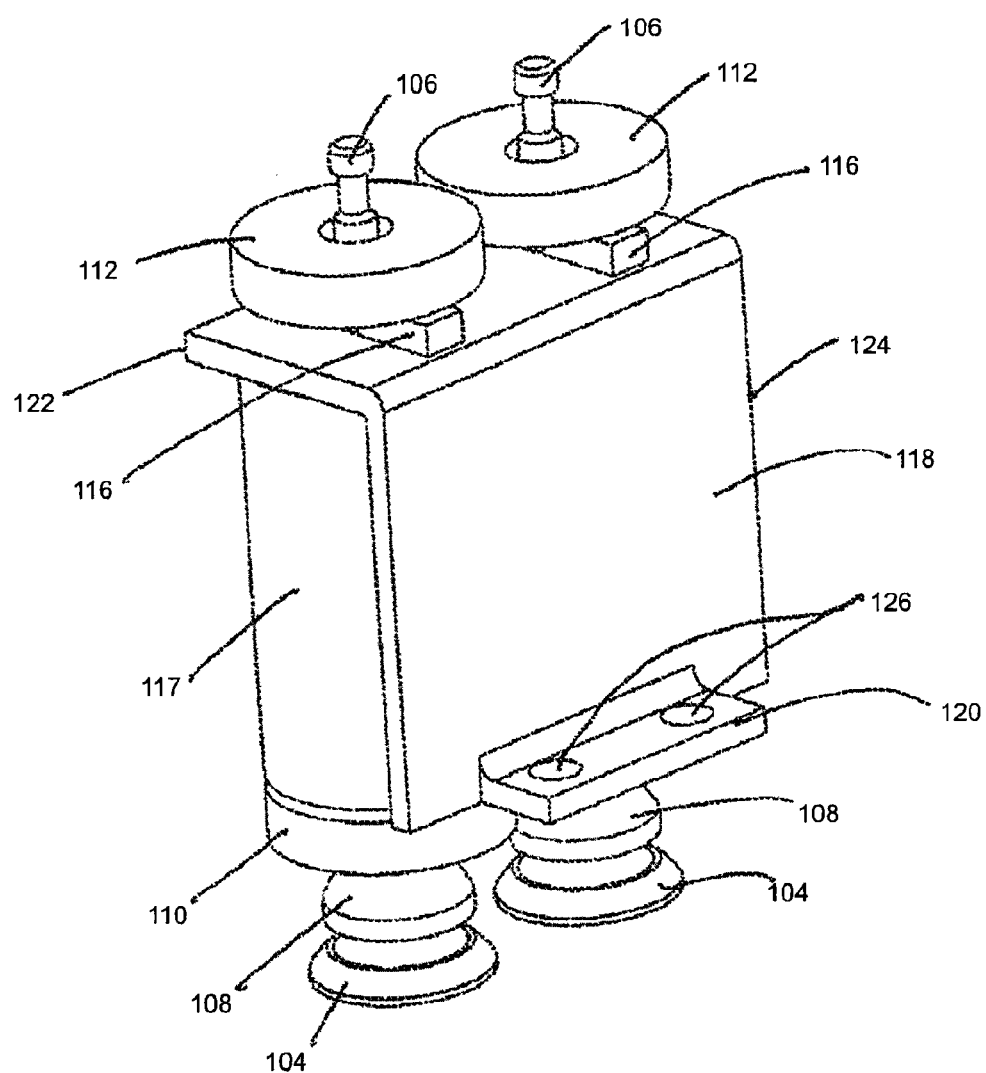
FIG. 9 is another perspective view of the dual valve assembly of FIG. 8.
Figure 10:
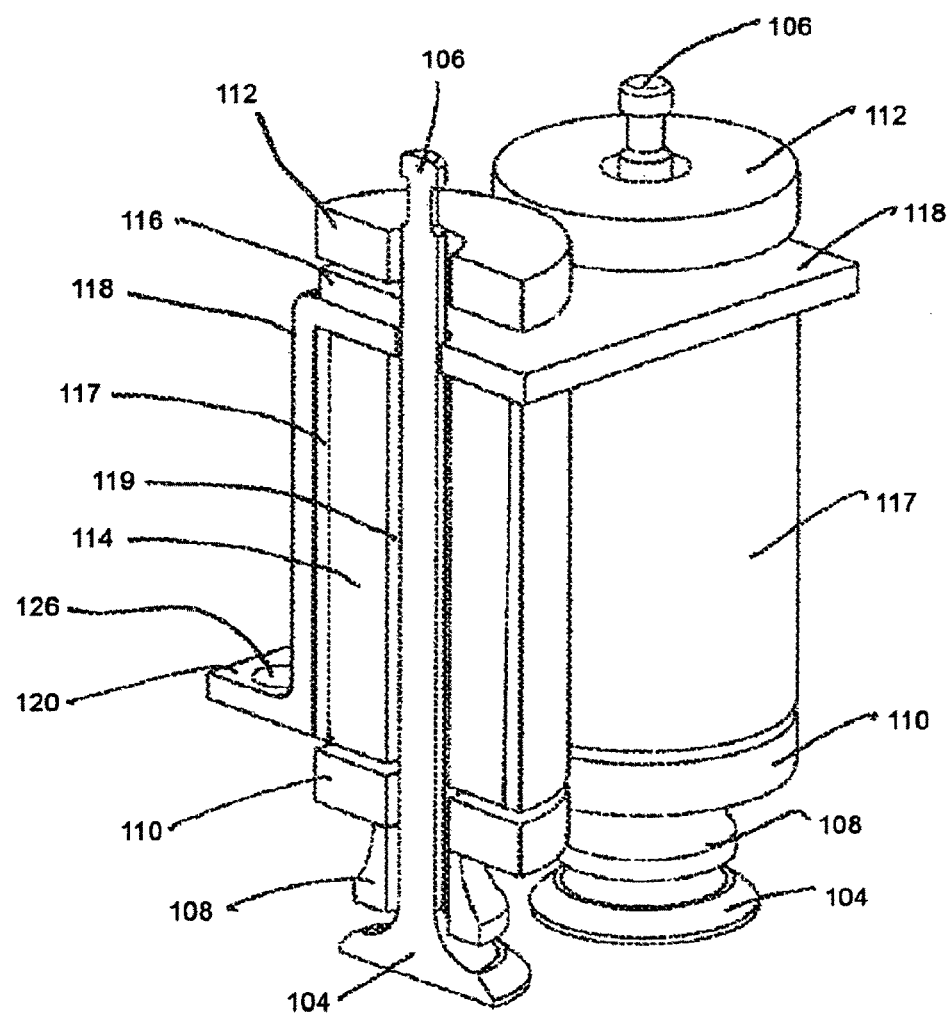
FIG. 10 is a perspective view of the dual valve assembly of FIG. 8 showing one of the valves in cross-section.
Figure 11:
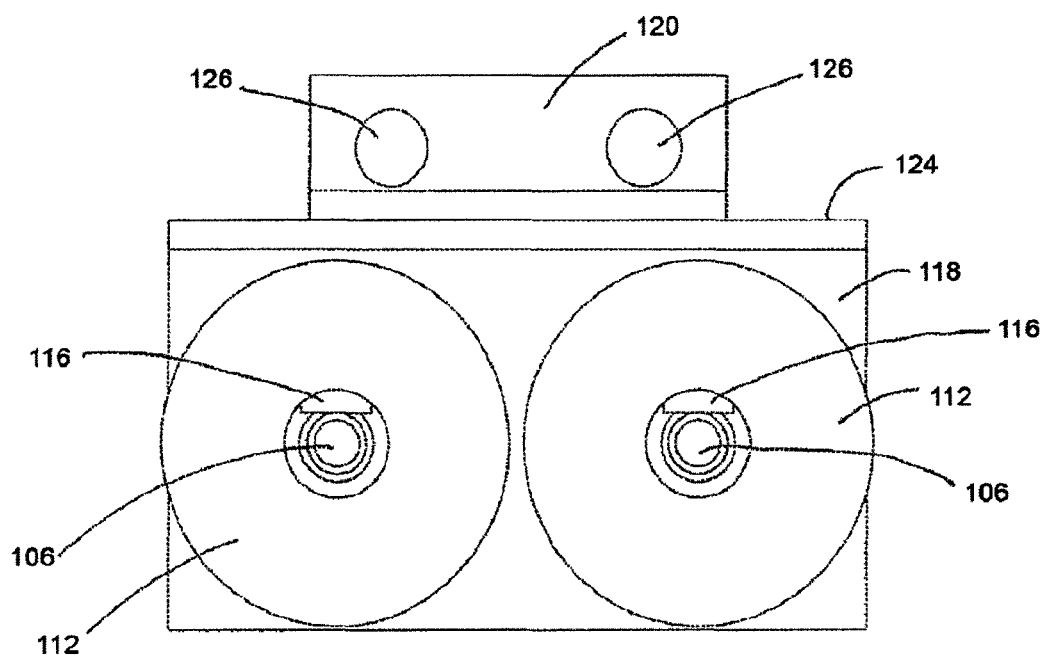
FIG. 11 is a top view of the dual valve assembly of FIG. 8.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various example embodiments; nevertheless, these embodiments are not intended to limit the present invention to any specific example, environment, application, or particular implementation described herein. Therefore, descriptions of these example embodiments are only provided for purpose of illustration rather than to limit the present invention. The linear motor valve actuation assembly and system of the present invention can be configured to operate any piston-type valve. For example, such valve systems can be employed in process flow control and medical applications, automated fluid filling of vessels and blood pumping, and the like. Another particularly advantageous application is valve actuation for internal combustion engines (ICEs), including both Otto cycle and Diesel cycle engines and variants thereof (e.g., Miller cycle).

The lift, duration and timing of the individual valves in the ICE can be adjusted independently from the crankshaft rotational speed and independent from the actuation of any of the other valves. Thus, for example, an engine with dual intake and/or dual exhaust valves for each cylinder can have each member of the pair of valves open and close with different timing, duration and lift to achieve desired combustion and exhaust characteristics throughout the entire operational speed range of the engine. The valve opening/closing operations can also be controllably dampened to enhance reliability. The assembly and system is also relatively simple, lightweight and low cost compared to prior attempts at improved valve actuation systems as discussed herein. In one embodiment, the spatial envelope is approximately four inches long and 1.5 inches in diameter. However, other package sizes can be employed without departing from the scope of the invention.

The control valve operation, an electronic control device (such as an electronic valve control (EVC) in ICE applications) controls the timing and movement of the valves based upon logic resident in the memory of the control device. Input variables, as will be discussed below, can be provided to the control device to provide for complex motion control suited to a wide variety of conditions, such as those that would occur in duty cycles of ICEs.

The acts, modules, logic and method steps discussed herein below, according to certain embodiments of the present invention, may take the form of a computer program or software code stored on a tangible or non-transitive machine-readable medium (or memory) in communication with a control device, comprising a processor and memory, which executes the code to perform the described behavior, function, features and methods. It will be recognized by one skilled in the art that these operations, structural devices, acts, logic, method steps and modules may be implemented in software, in firmware, in special purpose digital logic, and any combination thereof without deviating from the spirit and scope of the present invention as recited within the claims attached hereto.

Referring now to FIG. 1, a diagram is provided to illustrate the components of the valve assembly 100 according to one example embodiment of the invention. The valve 102 is a poppet-style valve. It includes a valve head 104 and a stem 106 extending upwardly from the head. These valve portions 104 and 106 are generally, but need not be, integral as a single piece. The stem 106 can be solid or hollow so that is can be filled with another material, such as sodium, to enhance heat transfer.

The valve 102 comprises, at least in part, a ferromagnetic material so that it can be actuated magnetically in response to the applied field of the magnetic coil. Magnetic alloys have been developed that possess Curie Temperatures suitable for the temperatures encountered by valves in ICEs.

Other valve train variables can be modified without departing from the scope of the invention, including the length of the valve stem, diameter of the valve head, and magnetic coil size and density.

The head 104 is shaped to conform to the valve seat of the head of the ICE so that it seals the corresponding port into the combustion chamber.

A valve guide 108 in the head of the ICE engages the stem to direct and restrain the movement of the valve. The valve guide shown in the figures represents the cylinder head that the valve fits into, which is removed for clarity.

A lower bearing 110 is disclosed above the valve guide. The lower bearing 110 surrounds the stem 106 and further guides the movement of the valve by preventing lateral movement of the stem 106. An upper bearing 112 is disposed more distally up the valve shaft and is configured and functions in the same manner as the lower bearing. Together, the bearings virtually eliminate any lateral movements of the valve and may restrict rotational movement, if desired, as the valve controllably oscillates linearly along the longitudinal axis of the stem as indicated by the arrow on FIG. 1.

A rigid and stationary coil assembly 114 is disposed between the lower 110 and upper 112 bearings. The coil assembly 114 comprises a plurality of wire (e.g., copper) windings 115 that surround the stem 106 of the valve. The coil (e.g., voice coil) is encased by an outer steel (or other suitable material) housing 117 to contain the magnetic flux created by energizing the coil 114. The wire that comprises the coil can be encased in epoxy in order to maintain the coil in the desired shape and prevent contamination and oxidization. An air gap 119 is defined between the valve and the inner surface of the coil assembly 114.

Application of a direct current (DC) voltage to the coil 114 causes the valve stem 106 to linearly translate in one direction or the other depending on the polarity of the applied voltage. Reversing the polarity reverses the direction of movement. Also, the current and voltage values applied to the coil can be varied. Thus, the position, velocity and acceleration of the valve can be highly varied by adjusting the voltage, current and polarity inputs to the coil. The computer can vary these inputs to achieve any desired movement characteristic of the valve.

The valve controllably moves between the closed and open positions, which define the stroke of the valve. In an ICE application, the closed position is defined where the valve head is extended downward to seat and close the respective intake/exhaust port in the head. The open position is defined where the valve head is at its most distant point of travel from the port in the head. Any number of intermediate positions between these end positions can also be achieved with immediate precision by operation of the coil assembly as disclosed herein. And the coil assembly can be selectably energized in order to move the valve at selected times, with selected distances, with selected velocities and with selected acceleration curves, all as determined by the computer controlling the coil's operation.

The valve assembly as discussed herein is advantageous because the drawbacks of traditional cam-operated drive mechanisms are eliminated. For example, weight, packaging and complexity are reduced. Reliability is greatly increased because wear components are eliminated. The increased control and adjustability of the valve operation allows the engine to be simultaneously optimized for emissions, idle, torque and horsepower through the entire range of possible driving conditions and duty cycles. And compared to moving coil valve drives, the present invention allows for operation through a full range of engine speeds and is able to operate with a realistic drive force and does not add the coil mass to the reciprocating mass.

The valve drive system disclosed herein provides constant force over the full valve stroke. Strokes can be small with very fast response times (e.g., less than one millisecond). This valve actuation system operates at very high speeds without cogging or force ripple with infinite resolution, which separates this total design from other variable cam timing attempts. Variable cam timing only changes the timing not the stroke. The present invention accomplishes both with infinite settings based upon closed loop operation. Closed loop operation couples the linear motor drive with feedback sensors to supply information to the computer, which adjusts the valve actuation parameters according to the rules-based logic programmed into the memory of the computer. Closed loop mode operation need not apply to all embodiments however.

A valve position sensor 116 is disposed along the stem 106 of the valve, such as between the coil assembly 114 and the upper bearing 112. The valve position sensor supplies valve position information to the computer. The position data can be used to calculate the velocity and acceleration of the valve as may be desired by the logic of the computer. More particularly, the valve position information can be used to calculate the following parameters of operation: 1. Stroke in inches from closed to opened position; 2. Velocity in inches per second from closed to opened position; 3. Acceleration in inches per second squared from closed to opened position; 4. Duration in seconds to hold valve open; 5. Stroke in inches from opened to closed position from origin; 6. Velocity in inches per second from opened to closed position; 7. Acceleration in inches per second squared from opened to closed position; and 8. Duration in seconds to hold valve closed and open. Other operational parameters and units of measurement can also be calculated without deviating from the scope of the present invention.

In one example embodiment, the acceleration of the valve can be approximately 320 ft/s$^2$ (98.1 m/s$^2$). The travel of the valve (stroke) can be approximately 0.5 inches (12.7 mm) maximum, and the valve can be approximately 300 inches per second (7.62 m/s). And the resulting time to complete one stroke is approximately 20-30 milliseconds. Of course, other operating parameters can be utilized without departing from the scope of the invention.

The components of the valve assembly 100, in one embodiment, are secured to a housing bracket 118. The housing bracket also includes a mounting flange 120 (as shown in FIGS. 2-11), to secure the valve assembly to the head of the ICE. The mounting bracket can be configured as necessary to permit secure mounting of the valve system in the desired position and orientation. In alternative, embodiments, the mounting bracket can be eliminated entirely. In yet a further alternative, a mounting flange or mounting means can be disposed on the outer surface of the housing 117.

Referring now to FIGS. 2-6, various views of the valve assembly 100 are shown for an ICE valve assembly comprising a single valve. The valve stem 106 can be seen protruding above the upper bearing 112. The valve head 104 can also be seen extending below the valve guide 108. The lower bearing 110 can be seen above the valve guide 108. The coil assembly 114 is shown disposed between the bearings 110 and 112. The position sensor 116 is disposed under the upper bearing 112 so that it can "see" the stem 106 of the valve.

The housing bracket 118 includes a horizontal section 122 disposed between the upper bearing 112 and the coil assembly 114, and specifically, between the position sensor 116 and coil assembly. The horizontal section 122 includes a generally centrally located aperture through which the valve stem 106 can pass. The bracket 118 further includes a vertical section 124 spanning the approximate length of the coil assembly. An outwardly extending mounting flange 120 is disposed at the lower end of the vertical section 124. The flange 120 further includes an aperture 126 to facilitate securing of the valve assembly to the head of the ICE. The various valve assembly components are secured to the bracket 118, either directly or indirectly.

The valve assembly according to additional embodiments of the invention can comprise more than one individual valve. Two, three, four or more valves may be joined in a single assembly. For example, a dual valve assembly is shown in FIGS. 7-11. The components are the same as previously discussed and as labeled in the figures. However, a single bracket 118 now secures the valve components together. Each valve continues to include its own coils, thus permitting independent actuation and control by the computer. Each valve also has its own corresponding position sensor 116. The mounting flange 120 includes a plurality of fastening apertures 126 to securely mount the assembly to the head of the ICE.

Figure 12:
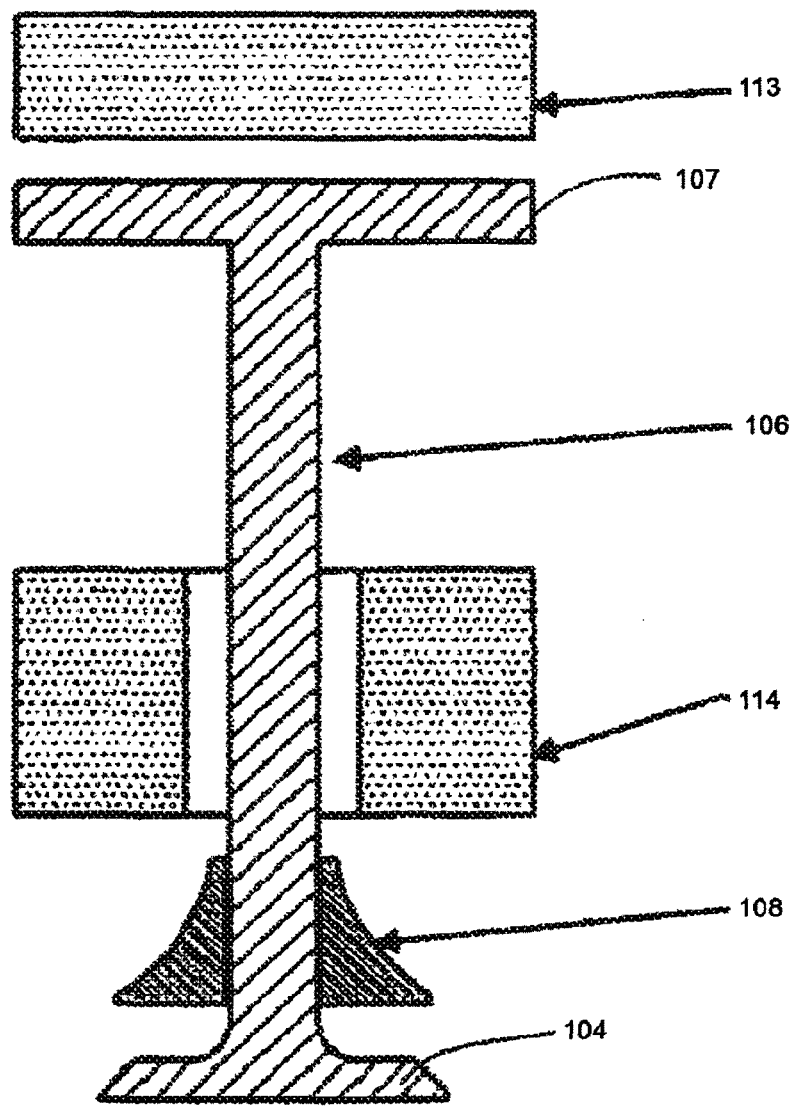
FIG. 12 is a cross sectional side view of a valve assembly according to certain example embodiments.

Referring now to FIG. 12, a diagram is provided to illustrate the components of an alternative example of a valve assembly 100. The valve stem 106 is generally T-shaped such that it includes a horizontal member 107 disposed at the end opposite the head 104. A fixed or stationary end coil 113 is disposed adjacent to the horizontal member 107. The combination of the end coil 113 and side coils 114 (similar to the previously-described embodiment) acting on the T-shaped stem 107 provides greater force for more applications where more force is required. Bearings (not shown) can also be included as provided in the previous figures.

Figure 13:
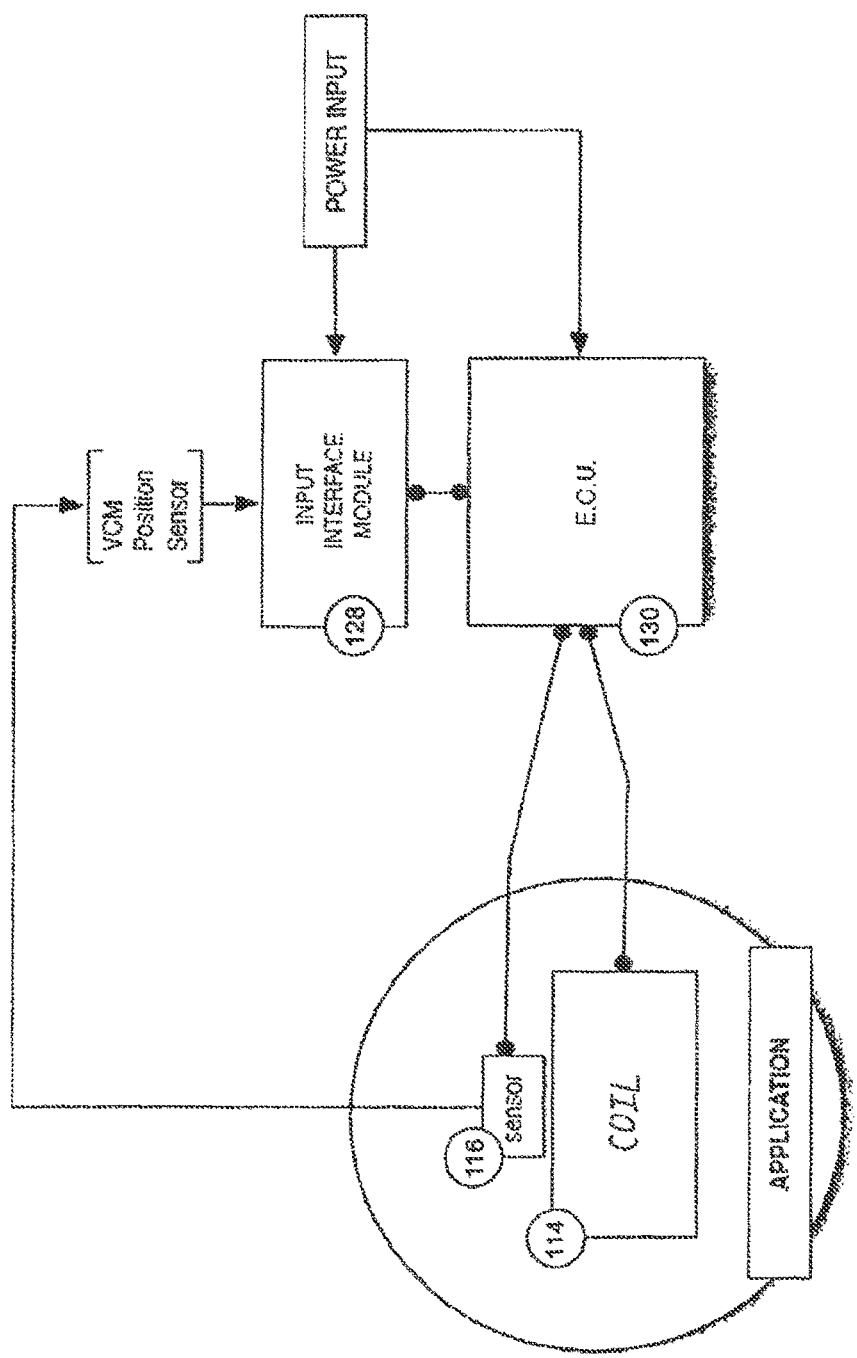
FIG. 13 is a block diagram of the components of a linear valve actuator according to certain example embodiments.

Referring now to FIG. 13, various components of the valve actuation system are illustrated. The output of the position sensor 116 (noted as LVA position sensor) is connected to an input/output module 128. The input/output module is a bidirectional signal conditioner and converter from USB format to serial format. The input/output module 128 converts the position sensor information to a signal that is supplied to the computer 130 where it is used to evaluate control operations for the valves.

The computer 130 comprises a processor and non-transitive tangible memory. The computer is electrically connected to both the position sensor 116 and the coil assembly 114. The connection to the position sensor 116 powers the sensor. The computer also selectively powers the coil 114 according to the rules-based software code resident in the computer's memory. As noted above, the computer selectively energizes the coil assembly 114 to cause the valve 102 to move to a specific position at a specific time, with a specific speed and acceleration. Each of these parameters can be controlled independently for each valve and can also be altered during a single stroke and from one stroke to the next.

For example, the valve can be controllably slowed down (decelerated) just before it reaches the valve seat so that it does not slam into the seat with a great force, which would be inefficient and might damage the valve. This cushioning feature extends the life of the engine compared to conventional valve assemblies that do not dampen the valve's movement. Also, the dampening can be supplied without the need for additional springs or other means to dampen the valve. This reduces weight, complexity and the overall cost of the valve train.

The "application" noted in FIG. 13 is an ICE. The number of valve assemblies can be varied depending on the number of cylinders present in the engine and the number of valves per cylinder employed, without departing from the scope of the invention. Typically there is at least one intake and one exhaust valve per cylinder. And most modern engines have two intake valves and two exhaust valves per cylinder.

Figure 14:
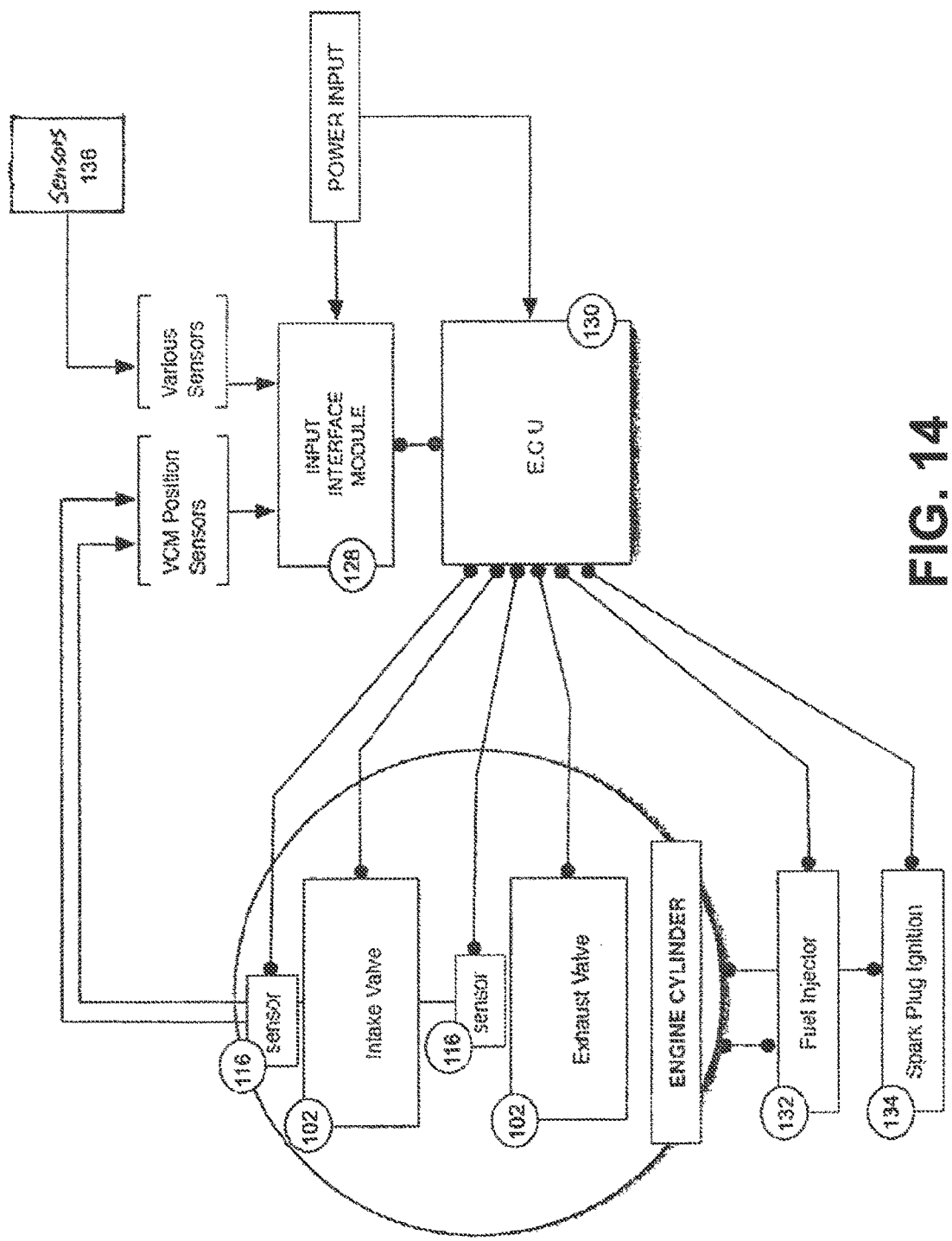
FIG. 14 is a further block diagram of a valve actuation system with EVC control for an ICE, according to certain example embodiments.

FIG. 14 adds additional details to the block diagram of FIG. 13 in order to illustrate the comprehensive control of engine parameters by the computer. Here, each of the intake and exhaust valves are controlled by the linear motors as discussed herein. Each valve 102 again includes its own valve position sensor 116. The sensors 116 and valve actuators are each connected to the computer 130 as discussed previously. The computer 130 is additionally operatively connected to the fuel injectors 132 and the spark plug ignition system 134. Thus, the computer can effectively control the entire combustion event in each cylinder (e.g., air intake, fuel injection, spark and exhaust).

The valve position information is again collected by an input interface module 128. This module can also receive information from additional sensors (collectively 136) disposed throughout the ICE, including for example: crank shaft TDC, exhaust gas temperature; oxygen ratios; mass air flow; throttle position; barometric pressure; ambient temperature; fuel injector volume and timing; and spark. This information is utilized by the rules-based control logic resident in the computer 130 to control the characteristics of the valve movement, spark and fuel injection in order to accomplish certain goals, such as efficiency, and power output for a given set of circumstances determined from the information collected by the various sensors noted above. This rules-based approach is far more customizable and adaptable than the more conventional tables-based approach to adjusting parameters in conventional ICEs. The resulting outputs are also far more exact since calculations are performed in real time using real parameters, rather than through predetermined lookup table values.

Figure 15:
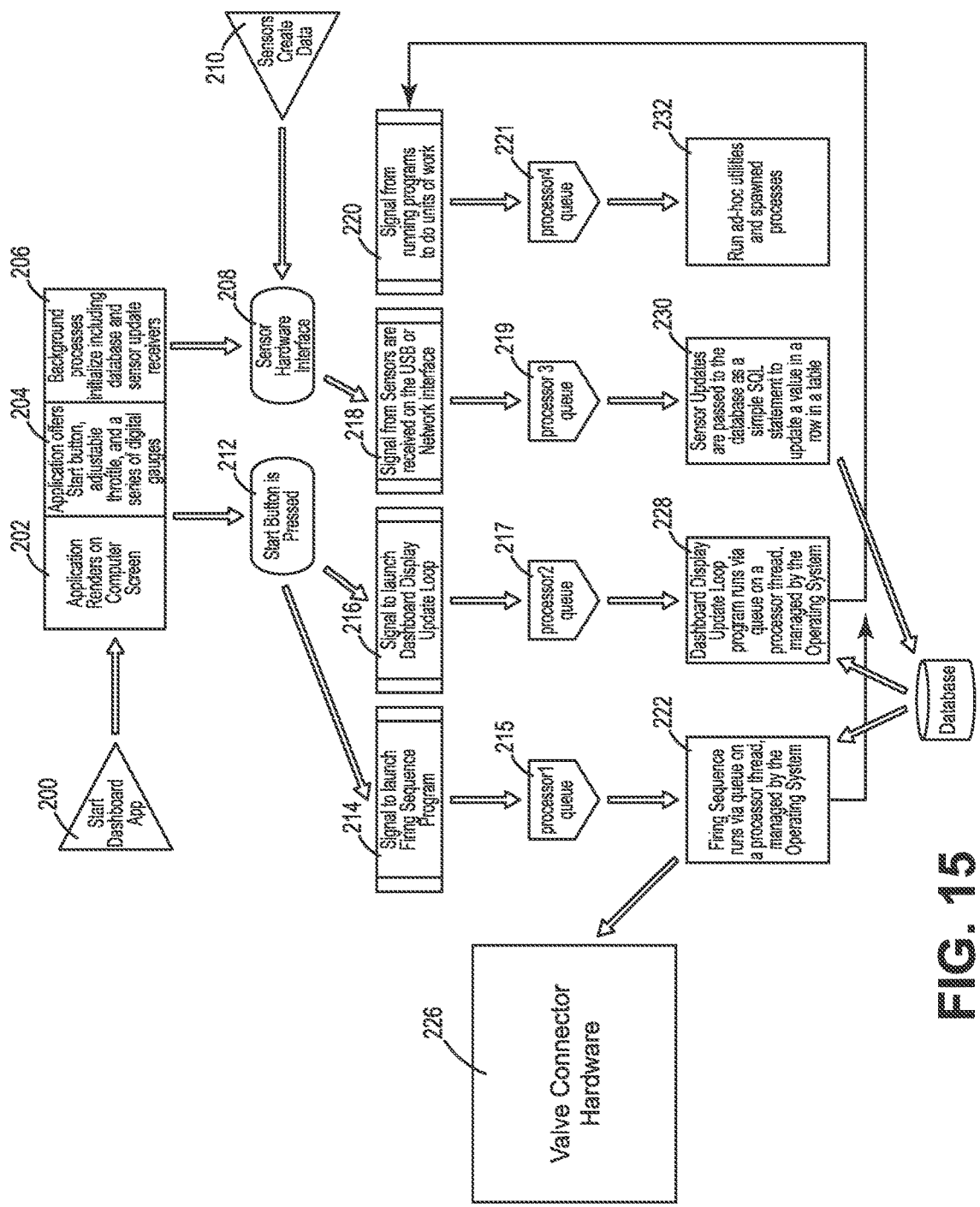
FIG. 15 is a flow chart of software program logic for a linear valve actuator, according to certain example embodiments.

FIG. 15 is a flow chart of the software program logic for a linear valve actuator system, according to certain example embodiments. This can be used by a manufacturer to alter vehicle operating parameters though a graphical user interface in operative communication with the control system during initial design and programming. A diagnostic application 200 is first initiated. The application renders on a graphical user interface 202 for the user to interact with. The application presents a plurality of buttons and gauges to the user 204, including start, throttle adjust and digital readouts of key operating parameters, such as engine RPM. A plurality of background processes are also begun upon starting the diagnostic application 206, including initializing the database and performing updates of the sensor receivers.

A sensor hardware interface device 208 is provided. It collects the sensor data 210 and converts it to the appropriate format for use by the processor when executing the program logic.

Upon pressing the start button 212, the firing sequence program is launched 214 and the diagnostic application display update is looped 216. Signals from the sensors are received 218 at the network interface or via the serial bus. Moreover, signals are received from running programs to do units of work 220.

Each of process steps 214, 216, 218 and 220 are individually queued in respective processor queues 215, 217, 219 and 221.

The firing sequence logic 214 runs via the queue 215 on the processor as managed by the operating system logic 222. The operating system logic further interfaces with the database 224 as necessary. The valve connector hardware 226 receives the firing sequence data 222 and then can relay valve control signals to the valve actuation means, such as that described herein.

The diagnostic application display update loop logic executes 228 via queue 217 on the processor as managed by the operating system. In step 230, sensor updates are passed to the database 224, as for example SQL statements, to update values in the data table. Also, ad-hoc utilities and spawned processes are managed 232.

The use of the diagnostic application will result in the development of final, production algorithms and look-up tables that are stored in the memory of the computer. The diagnostic application is used for development systems. Production systems hide the diagnostic application and operate automatically. The diagnostic application can be provided to or made accessible to service technicians with compatible scan tools.

Figure 16:
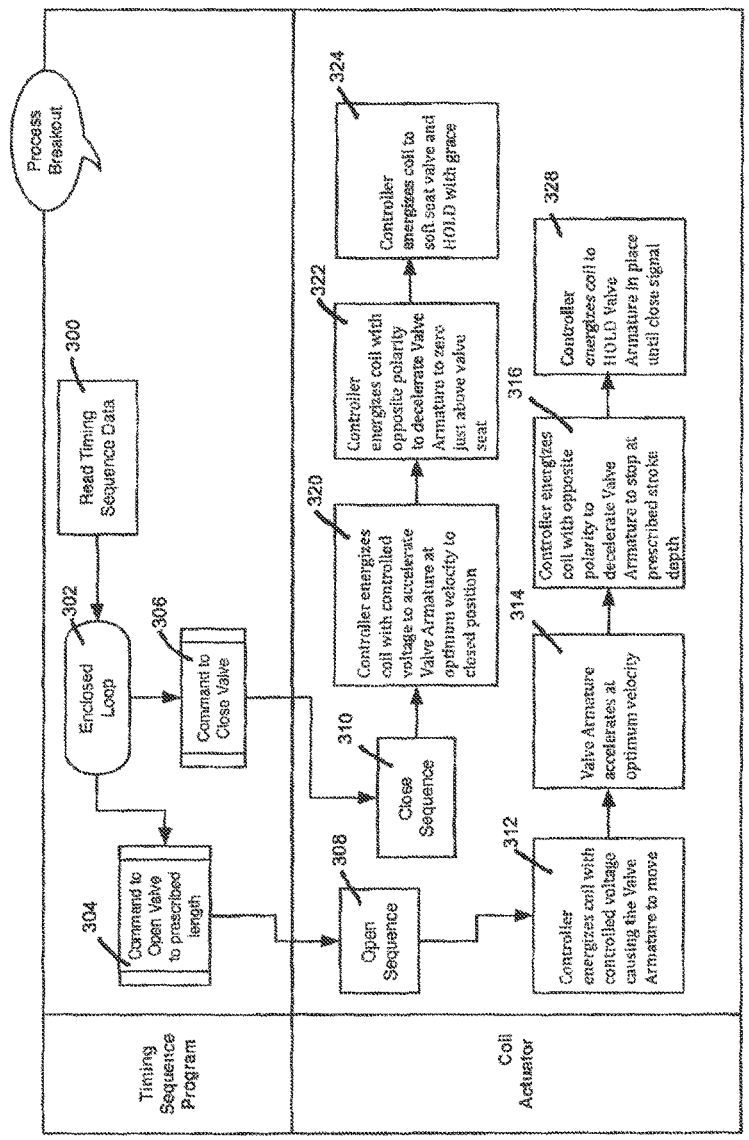
FIG. 16 is a logic diagram of a valve open/close sequence, according to certain example embodiments.

Referring now to FIG. 16, the logic of a valve open/close sequence for a single valve is diagramed. This logic is duplicated for each of the valves in a multi-valve implementation so that each valve can be controlled individually. The valve timing sequence data is read 300 and inputted into a closed control loop 302. The control loop includes commands to open the valve to a prescribed length or height 304, and a command to close the valve 306. If the open valve command 304 is given to the valve actuator, the open sequence 308 is followed by the actuator. If the close valve command 306 is given to the valve actuator, the close sequence 310 is followed by the actuator.

In the open sequence 308, the controller energizes the coil with controlled first voltage to cause the valve armature (stem 106) to move in a direction away from the valve seat 312. The valve thus accelerates at an initial rate 314. At a predetermined point of travel, the computer or controller energizes the coil with a voltage having an opposite polarity 316 to cause deceleration of the valve until the valve stops at a prescribed open position (stroke depth). The controller or computer then energizes the coil to hold the valve in place until receiving a close signal 318.

In the close sequence 310, the controller energizes the coil with a first controlled voltage to accelerate the valve toward the closed position at a first rate of acceleration 320. At a predetermined point of travel, the controller energizes the coil with a second voltage having an opposite polarity to cause the valve to decelerate to zero at a position just above the valve seat 322. The controller then energizes the coil with a third voltage to softly seat the valve against its seat and hold the valve in the seated position 324. Alternatively, the soft seating step 324 can be eliminated and the deceleration step 322 can be used to fully seat the valve, at which time the voltage polarity is switched to hold the valve in the closed position until an open command is received.

Figure 17:
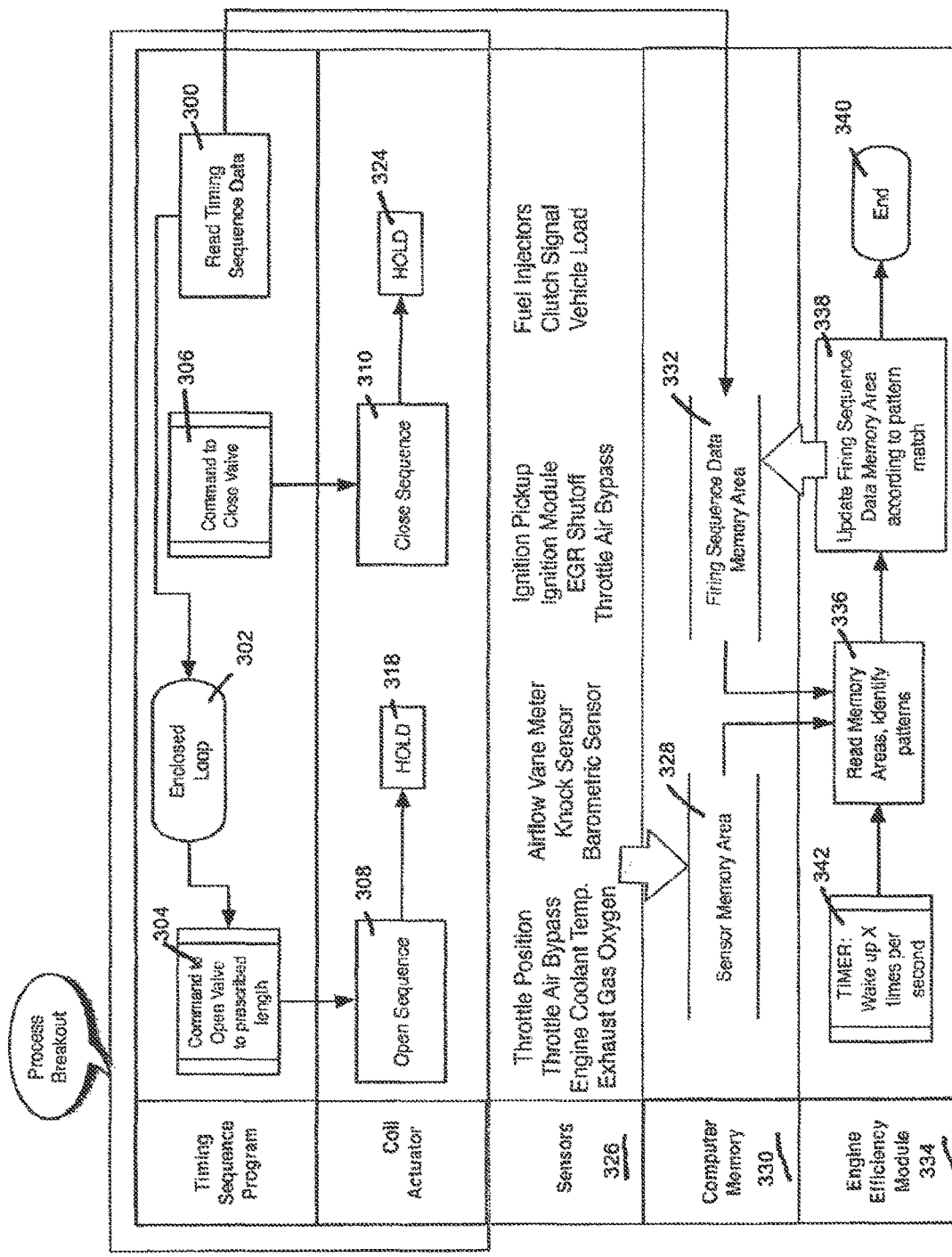
FIG. 17 is a process flow diagram, according to certain example embodiments.

FIG. 17 provides a diagram of portions of the valve actuation process flow from the perspective of several components of an ICE management system, including the valve timing sequence program of the computer, the coil actuator, the sensors, memory and the engine efficiency module (which may be software stored in memory of the computer). The timing sequence program includes the previously-described steps of reading the timing sequence data 300, entering the closed loop sequence 302 to command the valve to open 304, as well as commanding the valve to close 306. The coil actuator logic operation includes the previously-described steps of the open sequence 308, holding the valve open 318, the close sequence 310 and holding the valve closed 324.

As the ICE operates, the plurality of sensors 326 (including throttle position, throttle air bypass, engine coolant temperature, exhaust gas oxygen level, airflow meter, knock sensors barometric sensors ignition pickup, ignition module, exhaust gas recirculation (EGR) shutoff, fuel injectors, clutch, vehicle load, etc.) send their respective data to the sensor memory area 328 of the memory module 330 of the computer. The firing sequence data 332 is also stored in memory 330.

An engine efficiency module 334 or logic is also included in the computer or as part of a stand-alone module. This module can be formed as executable software code programmed in non-transitive memory that can be read and executed by a processor included in the computer. The engine efficiency module 334 includes the steps of reading from memory 336 some or all of the sensor data and the firing sequence data. Patterns in the retrieved data are identified and the firing sequence data are updated in the memory area 332 according to the data retrieval and pattern match step 336. The module 334 then ends 340 until woken up 342 periodically. The periodic wakeup signal can be provided by a timer responding to a set time period (e.g., several times per second) or every several revolutions of the crankshaft or every several clock cycles of the computer's processor. The system and logic described above provides for the control device that dynamically adjusts the timing and movement of the valves based upon a wide variety of operating conditions and variables.

Using this system logic, valve position, velocity and acceleration can be varied both during a valve stroke and from one stroke to the next, as controlled by the logic programmed on a non-transitive memory of the electronic valve control computer.

While the invention has been described in connection with what is presently considered to be the most practical and preferred example embodiments, it will be apparent to those of ordinary skill in the art that the invention is not to be limited to the disclosed example embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A control method for a valve, the method comprising:
   providing a stationary coil adapted to control linear movement of the valve;
   applying a first variable voltage having a first polarity to the stationary coil to decelerate a linear movement of the valve until the valve reaches a predetermined open position less than or equal to a fully open position; and
   applying a second variable voltage having a second polarity, opposite the first polarity, to the stationary coil such that one or more polarity reversals soft seat the valve and hold it in a closed position.

2. The method of claim 1, further comprising reading valve timing sequence data from a memory module.

3. The method of claim 1, further comprising writing data from a plurality of sensors to a memory module.

4. The method of claim 3, further comprising updating a firing sequence data in the memory module.

5. The method of claim 1, further comprising sensing valve position, and calculating valve velocity and acceleration values for use by a processor programmed with a control logic.

6. The method of claim 1, further comprising reading position data from a valve position sensor disposed along a stem of the valve.

7. The method of claim 6, further comprising a processor programmed with control logic such that the position data is processed to calculate a velocity of the valve.

8. The method of claim 6, further comprising a processor programmed with control logic such that the position data is processed to calculate an acceleration of the valve.

9. The method of claim 1, further comprising one or more operating sensors in operable communication with a processor.

10. The method of claim 9, wherein the one or more operating sensors are adapted to read data selected from a group consisting of: fuel injector data, exhaust data, air flow data, spark data, crank shaft data, throttle data, oxygen data, and temperature data.

11. A control method for a valve, the method comprising:

applying a first voltage at a first polarity to a stationary coil to accelerate the valve in an opening direction at a first opening acceleration rate;

applying to the stationary coil a second voltage at a polarity opposite the first polarity to decelerate the valve until it reaches a predetermined open position less than or equal to a fully open position;

holding the valve at the predetermined open position;

applying to the stationary coil a third voltage at a polarity opposite the first polarity to accelerate the valve member in a closing direction with a first closing acceleration rate;

applying to the stationary coil a fourth voltage at a polarity opposite the third polarity to decelerate the valve until it reaches a predetermined closing position adjacent a valve seat; and applying to the stationary coil a fifth voltage at a polarity opposite the first polarity such that one or more polarity reversals soft seat the valve and hold it in a closed position.

12. The method of claim 11, further comprising reading valve timing sequence data from a memory module, and initiating the application of the first and third voltages based upon the read valve timing sequence data.

13. The method of claim 11, further comprising writing data from a plurality of sensors to a memory module.

14. The method of claim 13, further comprising updating a firing sequence data in the memory module.

15. The method of claim 11, further comprising sensing valve position, and calculating valve velocity and acceleration values for use by a processor programmed with a control logic.

16. The method of claim 11, further comprising one or more operating sensors in operable communication with a processor.

17. The method of claim 16, wherein the one or more operating sensors are adapted to read data selected from a group consisting of: fuel injector data, exhaust data, air flow data, spark data, crank shaft data, throttle data, oxygen data, and temperature data.

18. The method of claim 16, further comprising processing rule-based logic provided with the processor.

19. The method of claim 11, further comprising processing rule-based logic provided with a processor.

20. The method of claim 19, wherein the rule-based logic is used to control actuation parameters for the valve.

* * * * *